United States Patent
Mayblum et al.

(10) Patent No.: US 8,590,057 B1
(45) Date of Patent: Nov. 19, 2013

(54) ENCRYPTION AND AUTHENTICATION OF COMMUNICATIONS AND CONTENT PAYLOAD OVER EXISTING NETWORKS

(75) Inventors: Amir Mayblum, Walnut Creek, CA (US); Ye Huang, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 99 days.

(21) Appl. No.: 13/184,119

(22) Filed: Jul. 15, 2011

(51) Int. Cl.
*H04L 9/38* (2006.01)
*H04L 9/32* (2006.01)

(52) U.S. Cl.
USPC .................................. 726/28; 726/17; 726/29

(58) Field of Classification Search
None
See application file for complete search history.

(56) References Cited

U.S. PATENT DOCUMENTS 7,142,676 B1 * 11/2006 Hillier et al. ................. 380/278
8,295,490 B1 * 10/2012 Mccoy et al. ................. 380/279

* cited by examiner

*Primary Examiner* — Venkat Perungavoor

(57) ABSTRACT

A server may receive encryption key requests that each identify a sender of the encryption key request and at least one recipient of information that is to be encrypted with the requested encryption key. In response, an encryption key may be sent to the sender of the encryption key request. Information identifying the sender and the at least one recipient may be stored. The server may receive decryption key requests that each identify a sender of the decryption key request and a sender of encrypted information. In response, a decryption key may be sent to the sender of the decryption key request if and only if the sender of encrypted information and the sender of the decryption key request, as both identified by the information in the decryption key request, match, respectively, a sender of an encryption key request and an associated recipient, as both identified by the stored information.

22 Claims, 3 Drawing Sheets

ENCRYPTION AND AUTHENTICATION OF COMMUNICATIONS AND CONTENT PAYLOAD OVER EXISTING NETWORKS

BACKGROUND

1. Technical Field

This disclosure relates to network communication systems, such as cellular communication networks, and to encryption.

2. Description of Related Art

Encrypting information that is communicated over a network, such as instant messages, emails, documents, and multimedia content, can be of great importance. Unfortunately, some networks are not configured in a way that readily facilitates end-to-end encryption. For example, sending encrypted messages between mobile devices may be limited to devices that are both equipped with compatible solutions. In other cases, encryption may only be available within the boundaries of an enterprise. This can limit implementation of message encryption as the service may not be widespread enough to allow for cross enterprise (B2B) and consumer (B2C) communication, such as communications within medical trials with participants and additional security for password resets on bank accounts.

SUMMARY

An encryption and decryption key server system may include a data processing module that receives encryption key requests from a network interface that communicates information through a computer network. Each encryption key request may include information identifying a sender of the encryption key request and at least one recipient of information that is to be encrypted with the requested encryption key. In response to the receipt of each encryption key request, the data processing module may cause the network interface to send an encryption key to the sender of the encryption key request. The encryption key may enable the information to be encrypted. The data processing module may store information identifying the sender of the encryption key request in association with the at least one recipient identified in the encryption key request.

The data processing module may receive decryption key requests from the network interface. Each request may include information identifying a sender of the decryption key request and a sender of encrypted information. In response to the receipt of each decryption key request, the data processing module may cause the network interface to send a decryption key to the sender of the decryption key request. The decryption key may be sent if and only if the sender of encrypted information and the sender of the decryption key request, as both identified by the information in the decryption key request, match, respectively, a sender of an encryption key request and an associated recipient, as both identified by the stored information.

An authentication module may authenticate the sender of each encryption key request. The data processing module may not cause an encryption key to be sent to a sender of an encryption key request, unless the sender of the encryption key request is authenticated by the authentication module.

The authentication module may authenticate the sender of each decryption key request. The data processing module may not cause a decryption key to be sent to a sender of a decryption key request unless the sender of the decryption key request is authenticated by the authentication module.

The encryption and decryption key server system may not send or receive the encrypted information.

An enterprise server may be located within an enterprise domain and contain the data storage system, the network interface, and the data processing module. A proxy server may be located outside of the enterprise domain, and may receive each encryption key request, deliver each encryption key request to the enterprise server, receive each encryption key from the enterprise server, send each encryption key to the sender of the encryption key request, receive each decryption key request, deliver each decryption key request to the enterprise server, receive each decryption key from the enterprise server, and send each decryption key to the sender of the decryption key request.

At least one of the encryption key requests may identify multiple recipients of the information that is to be encrypted with the requested encryption key.

The recipient may be identified by a phone number and the encrypted information may be an instant message.

The recipient may be identified by an email address and the encrypted information may be an email.

Each of the encryption and/or decryption keys may be different.

An encrypting communication device may include a data processing module that may cause a network interface configured to communicate information through a computer network to send the encryption key request to the encryption and decryption key server system. The data processing module may receive the encryption key from the network interface in response to the encryption key request. The data processing module may cause an encryption module to encrypt the information using the encryption key. The data processing module may cause the network interface to send the encrypted information to the at least one recipient identified in the encryption key request at an address that is different from the address of the encryption and decryption key server system.

The data processing module may cause the network interface to deliver information indicative of the address of the encryption and decryption key server system to the at least one recipient, along with the encrypted information.

An authentication module may authenticate the sender to the encryption and decryption key server system.

The encryption key request may identify multiple recipients of the information that is to be encrypted with the requested encryption key.

A decrypting communication device may include a data processing module that may receive encrypted information from a network interface configured to communicate information through a computer network. The data processing module may cause the network interface to send the decryption key request to the encryption and decryption key server system at an address that is different than the address from which the encrypted information was received. The data processing module may receive the decryption key from the network interface in response to the decryption key request. The data processing module may cause a decryption module to decrypt the encrypted information using the decryption key.

The data processing module may receive the address of the encryption and decryption key server system from the network interface along with the encrypted information.

An authentication module may authenticate the sender of the decryption key request to the encryption and decryption key server system.

Non-transitory, tangible, computer-readable media may contain a program of instructions configured to cause a computer system running the program of instructions to perform the functions recited herein.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
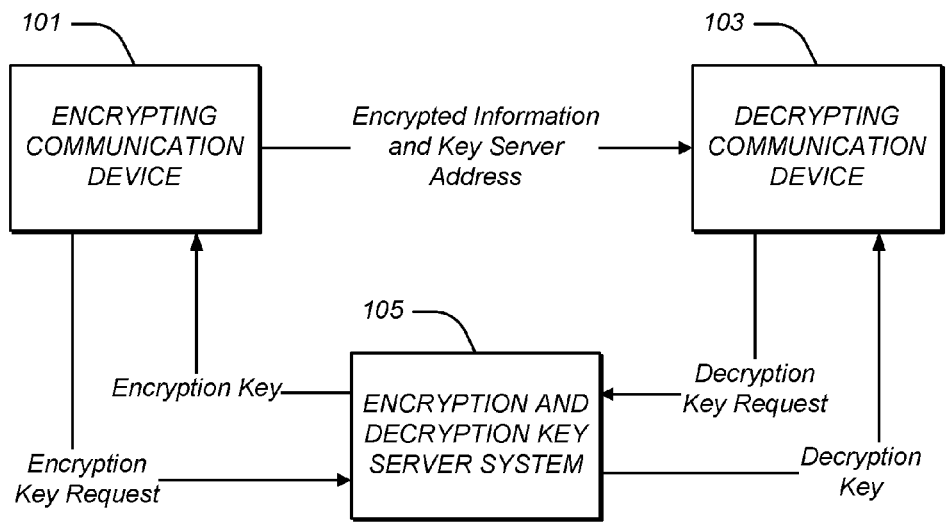
FIG. 1 illustrates a network communication system that includes an encrypting communication device 101, a decrypting communication device 103, and an encryption and decryption key server system 105.

FIG. 1 illustrates a network communication system that includes an encrypting communication device 101, a decrypting communication device 103, and an encryption and decryption key server system 105. As illustrated in FIG. 1, the encrypting communication device 101 is configured to send an encryption key request to the encryption and decryption key server system 105. In response, the encryption and decryption key server system 105 is configured to return an encryption key to the encrypting communication device 101.

The encrypting communication device 101 is configured to encrypt information using this encryption key. The encrypting communication device 101 is configured to send this encrypted information, along with an unencrypted address of the encryption and decryption key server system 105, to the decrypting communication device 103. The address may be in any form, such as a URL or an IP address.

The decrypting communication device 103 is configured to send a decryption key request to the encryption and decryption key server system 105 at the address it received from the encrypting communication device 101. In response, the encryption and decryption key server system 105 is configured to send a decryption key to the decrypting communication device 103. The decrypting communication device 103 is configured to decrypt the encrypted information using this decryption key.

The encrypting communication device 101 and the decrypting communication device 103 may be of any type. For example, each may be a wireless mobile communication device, such as a mobile phone, laptop computer, tablet computer, or PDA. Each may also be a wired communication device, such as a desktop computer.

The encrypting communication device 101, the decrypting communication device 103, and the encryption and decryption key server system 105 are configured to communicate with one another over a computer network. The computer network may consist of or include a cellular communication network, the internet, a WiFi network, a local area network, a wide area network, or any combination of these.

Figure 2:
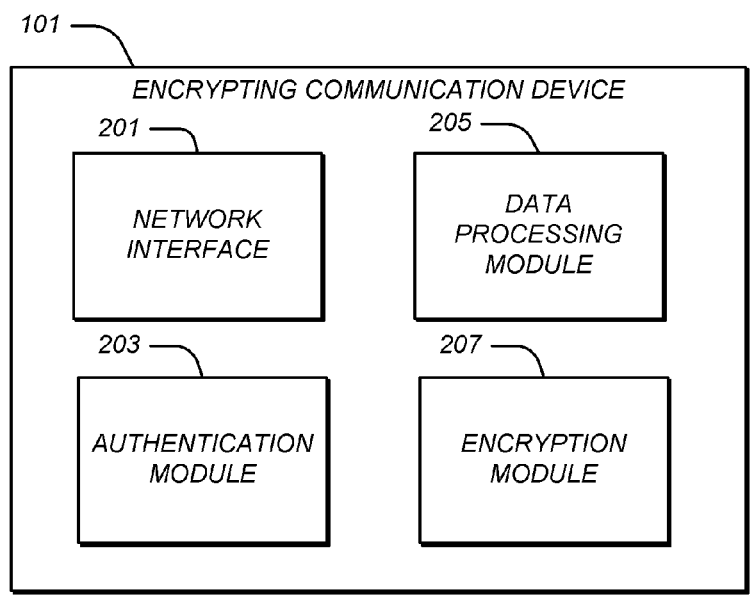
FIG. 2 illustrates an example of the encrypting communication device 101 illustrated in FIG. 1.

FIG. 2 illustrates an example of the encrypting communication device 101 illustrated in FIG. 1.

Figure 3:
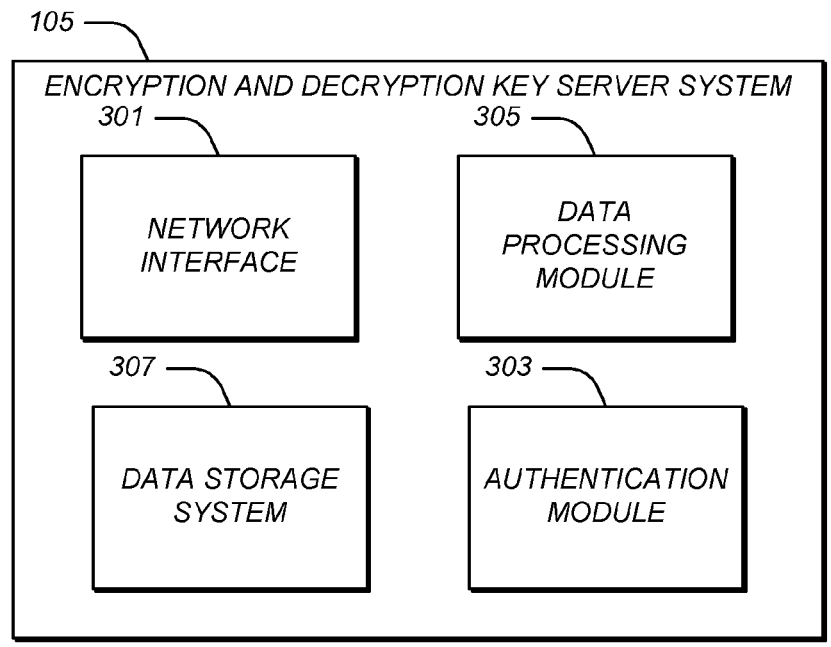
FIG. 3 illustrates an example of the encryption and decryption key server system 105 system illustrated in FIG. 1.

FIG. 3 illustrates an example of the encryption and decryption key server system 105 system illustrated in FIG. 1.

Figure 4:
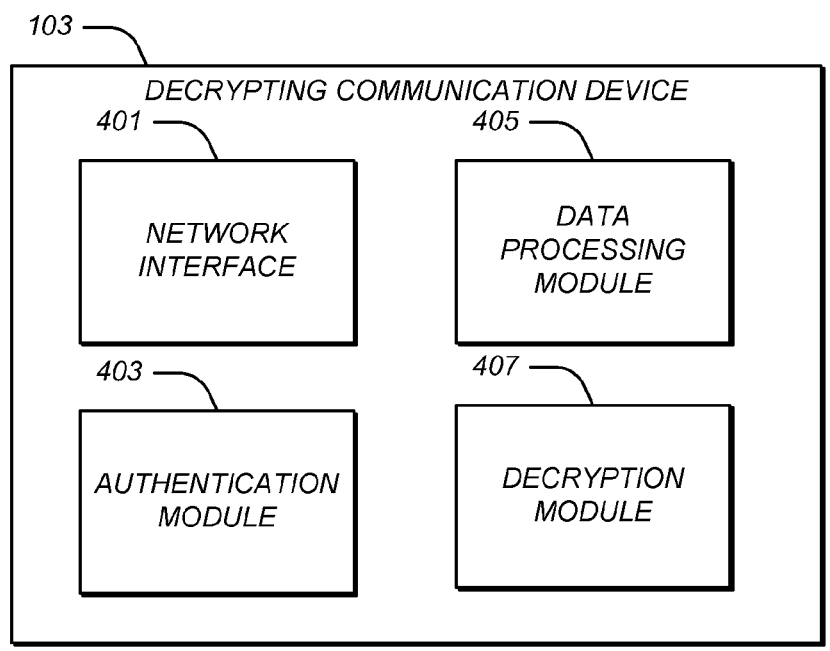
FIG. 4 illustrates an example of the decrypting communication device 103 illustrated in FIG. 1.

FIG. 4 illustrates an example of the decrypting communication device 103 illustrated in FIG. 1. These devices may include additional components.

The encrypting communication device 101, the encryption and decryption key server system 105, and the decrypting communication device 103 has a network interface 201, 301, and 401, respectively. Each network interface is configured to communicate information through a computer network, such as through a computer network of any of the types discussed above.

The encrypting communication device 101 includes a data processing module 205. The data processing module 205 is configured to cause the network interface 201 to send the encryption key request to the encryption and decryption key server system 105. The encryption key request includes information indentifying a sender of the encryption key request and at least one recipient of information that is to be encrypted with the requested encryption key.

The sender of the encryption key request may be identified in any way. If the information to be encrypted is an instant message, for example, the sender may be identified by a phone number. If the information to be encrypted is an email, for example, the sender may be identified by an email address. Other forms of identification may an addition or instead be used, such as an IP address and/or a URL.

The recipient may be identified in any way, such as in any of the ways just discussed in connection with the sender. When the sender plans on delivering the encrypted information to more than one recipient, multiple recipients may be identified in the encryption key request.

The network interface 301 in the encryption and decryption key server system 105 receives this encryption key request and passes it to the data processing module 305 in the encryption and decryption key server system 105.

An authentication module 303 within the encryption and decryption key server system 105 may optionally seek to authenticate the sender identified in the encryption key request. Any type of authentication may be used. For example, the authentication module 303 may seek authentication information from an Authentication, Authorization, and Accounting (AAA) server (not shown) that may be part of the computer network system. The authentication module 303 may in addition or instead seek information from the encrypting communication device 101, such as information that may be present in a SIM card within the encrypting communication device and/or a user name and password. When requested, a corresponding authentication module 203 within the encrypting communication device 101 is configured to facilitate the delivery of this information back to the authentication module 303 in the encryption and decryption key server system 105. The authentication approach may confirm the sender's and receiver's identity on the mobile network and reach out to an enterprise that originated the message to make sure the receiver was in fact allowed to view the message, before a decryption key is provided. The authentication algorithm may include multiple sources of validation, including the mobile network, where the device is authenticated, originating enterprise, where the origination and destination phone numbers can be validated to have authorization to view the message content, and a password to authenticate the user.

If the authentication effort fails, the data processing module 305 in the encryption and decryption key server system 105 may be configured to send a message back to the encrypting communication device 101. This message may advise the encryption and decryption key server system 105 that authentication has failed. In this case, the data processing module 305 does not return an encryption key to the encrypting communication device 101.

If authentication is successful, on the other hand, the data processing module 305 is configured to cause the network interface 301 to send an encryption key to the sender of the encryption key request that is configured to enable the information to be encrypted.

The encryption key may be of any type and may be generated by the data processing module 305 using any means. For example, the key may be a symmetric or an asymmetric key. The key encryption mechanism may be a standard one or a proprietary one. Public key/private key settings may be used or a symmetric encryption key, depending on the algorithm available on the UE and the security requirements for that specific content. Another option is to use IBAKE or a similar approach. This approach may remove the need to acquire a key on the originating side, as it may rely on a publicly known key for encryption. However, to this approach may require a multiparty message that is being sent encrypted to use different keys to different destinations, which may be inefficient. A key may be acquired by calculation, rather than a query to a key server.

The data processing module 305 is also configured to store information in a data storage system 307 identifying the sender of the encrypted key request in association with each recipient identified in the encryption key request.

The encryption key is received by the network interface 201 in the encrypting communication device 101 and passed to an encryption module 207 that is configured to encrypt the information using the encryption key. The data processing module 205 causes the encryption module 207 to encrypt the information using the encryption key.

The data processing module 205 is configured to cause the network interface 201 to send the encrypted information to the at least one recipient identified in the encryption key request. The at least one recipient is illustrated in FIG. 1 as the decrypting communication device 103. The address of at least one recipient is different than the address of the encryption and decryption key server system 105. The portion of the computer network system that is used to deliver the encrypted information may be an existing computer network system that may require no modification to facilitate the delivery of this information. For example, this portion of the computer network may be a cellular communication network, the internet, a WiFi network, a local area network, a wide area network, or any combination of these.

Along with the encrypted information, the data processing module 205 may be configured to cause the address of the encryption and decryption key server system 105 to be delivered to the at least one recipient, along with the encrypted information. In other configurations, this address information may not be send.

If more than a single recipient was identified in the encryption key request, the data processing module 205 may cause the network interface 201 to also send the encrypted information and, optionally, the address of the encryption and decryption key server system 105, to each of the other designated recipients, again at addresses that are different than the address of the encryption and decryption key server system 105. Again, the portion of the computer network system that is used to deliver this encrypted information to each of the other recipients may be an existing computer network system that may require no modification to facilitate the delivery of this information. For example, this portion of the computer network may be a cellular communication network, the internet, a WiFi network, a local area network, a wide area network, or any combination of these.

The encryption and decryption key server system 105 may never send or receive any of the encrypted information.

The encrypted information and any address that is provided with it are received by the network interface 401 in the decrypting communication device 103. An authentication module 403 may be configured to authenticate the encrypting communication device 101 using any type of authentication, such as any of the types discussed above. In such a case, the authentication module 203 in the encrypting communication device 101 is configured to provide whatever information is needed as part of this authentication process.

If the authentication fails, a data processing module 405 in the decrypting communication device 103 may be configured to send a notification back to the encrypting communication device 101, advising that authentication has failed. The data processing module 405 may in this event be configured not to proceed further with the decryption process.

If authentication succeeds, on the other hand, the data processing module 405 is configured to cause the network interface 401 to send the decryption key request to the encryption and decryption key server system 105. If the address of the encryption and decryption key server system 105 was included along with the encrypted information from the encrypting communication device 101, the data processing module 405 is configured to send the decryption key request to the encryption and decryption key server system 105 at this address. If the address is not provided, the data processing module 405 may be configured to send the decryption key request to a pre-programmed address for the encryption and decryption key server system 105, or to another server that may return this address. In any case, the address to which the decryption key request is sent is different than the address of the encrypting communication device 101.

The decryption key request includes information identifying the sender of the decryption key request and the sender of the encrypted information. Each sender may be identified in any way, such as in any of the ways discussed above in connection with the encryption key request.

The decryption key request is received by the network interface 301 in the encryption and decryption key server system 105.

The authentication module 303 may be configured to authenticate the decrypting communication device 103. It may do so using any type of authentication, such as any of the types discussed above. The authentication module 403 in the decrypting communication device 103 is configured to provide any authentication information that may be required.

If authentication fails, the encryption and decryption key server system 105 may be configured to provide notification of the failure to the decrypting communication device 103, following which the encryption and decryption key server system 105 will not provide any decryption key to the decrypting communication device 103.

If authentication is successful, on the other hand, the data processing module 305 within the encryption and decryption key server system 105 is configured to query the data storage system 307. The query is configured to determine whether the sender of the encrypted information and the sender of the decryption key request, as both identified by the information in the decryption key request, match, respectively, a sender of an encryption key request and an associated recipient, as both identified by the information in the data storage system 307. If there is a match, the data processing module 305 is configured to cause the network interface 301 to send the decryption key to the sender of the decryption key request.

The decryption key that the data processing module 405 sends back is configured to enable the decrypting communication device 103 to decrypt the encrypted information that it received from the encrypting communication device 101. The exact form of the decrypting key will depend upon the form of an encryption that was used by the encrypting communication device 101 in the first instance. One example is the use of PKI setting that has been used over the Internet where the originator is issued a public key to encrypt content that is later decrypted only with a paired private key. Another example is a symmetric key where the same key is issued for both origination and destination devices. A still further example is the use of IBAKE-based encryption, where the key on the sending side is calculated using a "known secret", but may require the key authority to provide the decryption key. This approach may be an evolution of the PKI based key and may eliminate the need for to the server on the sending side. It may, however, be inefficient for multiparty messages. As with IBAKE-based encryption, the key may be destination dependent, and may require messages to be encrypted separately for each destination. The key authority component may support multiple encryption schemes to overcome possible optimization concerns.

When returned, the decryption key is received by the network interface 401 and passed to a decryption module 407. The data processing module 405 is configured to cause the decryption module 407 to decrypt the encrypted information using the decryption key.

Figure 5:
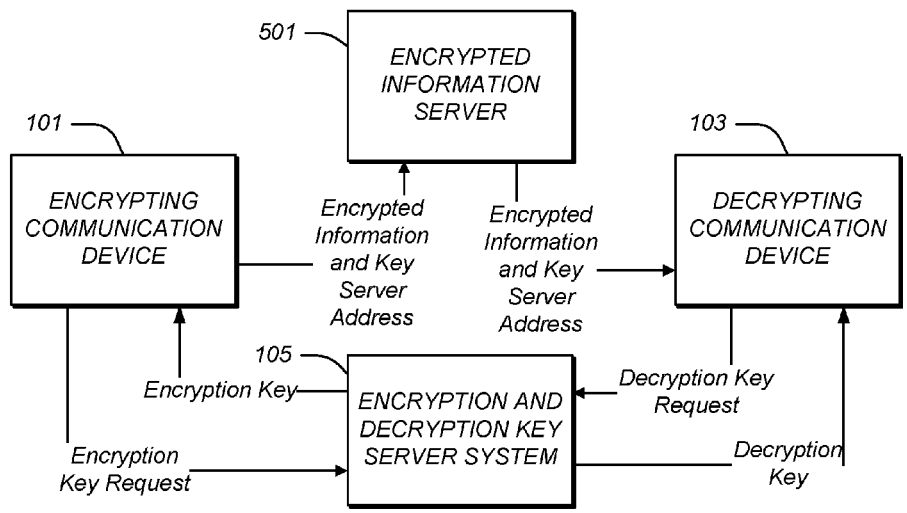
FIG. 5 illustrates an alternate configuration of the network communication system illustrated in FIG. 1.

FIG. 5 illustrates an alternate configuration of the network communication system illustrated in FIG. 1. As illustrated in FIG. 5, the encrypting communication device 101, the decrypting communication device 103, and the encryption and decryption key server system 105 remain present. Each of these is configured with the same components and is configured to perform the same functions as described above in connection with FIGS. 1-4.

One difference between the embodiment shown in FIG. 5 and that shown in FIG. 1, however, is that the data processing module 205 in the encrypting communication device 101 is configured to deliver the encrypted information, along with any optional address that is provided, to an encrypted information server 501, rather than to the decrypting communication device 103. Thus, unlike the embodiment shown in FIG. 1, in which the encrypted information and key server address is communicated directly from the encrypting communication device 101 to the decrypting communication device 103, a trusted intermediary (encrypted information server 501) is used to communicate the information indirectly. This enables the information to be communicated, even if the decrypting communication device 103 is not able to receive the information at the time it is delivered by the encrypting communication device 101.

The encrypted information server 501 is configured to receive and store the encrypted information, such as encrypted instant messages, emails, documents, and/or multimedia content, along with any address information that is provided. The encrypted information server 501 may also function as an instant messaging server, an email server, a document server, and/or a multimedia server.

The encrypted information server 501 may be configured with an authentication module (not shown) that may require authentication of the encrypting communication device 101 before accepting any encrypted information and related address for storage. Again, any type of authentication may be used, such as any of the types discussed above.

Correspondingly, the decrypting communication device 103 is configured to receive the encrypted information, along with any optional address that is provided, from the encrypted information server 501, rather than from the encrypting communication device 101. The decrypting communication device 103 may be configured to request this information from the encrypted information server 501, in which case the encrypted information server 501 is configured to return it in response. This may be done, for example, on demand or in accordance with a schedule. The encrypted information server 501 may instead be configured to push this information to the decrypting communication device 103. Again, this may be done on demand or in accordance with a schedule. In either case, the encrypted information server 501 may be configured to require authentication of the decrypting communication device 103 before providing any encrypted information and/or related address. Again, any type of authentication may be used, such as any of the types discussed above.

Figure 6:
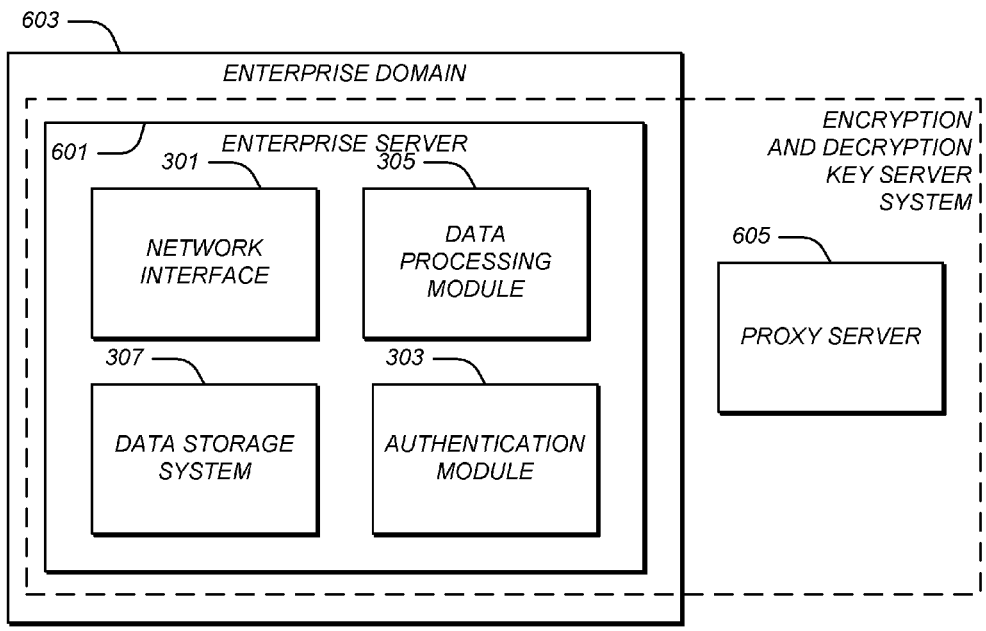
FIG. 6 illustrates an enterprise configuration of the encryption and decryption key server system illustrated in FIG. 1.

FIG. 6 illustrates an enterprise configuration of the encryption and decryption key server system illustrated in FIG. 1. As illustrated in FIG. 6, the network interface 301, the data processing module 305, data storage system 307, and the authentication module 303 are housed within an enterprise server 601 within an enterprise domain 603. The enterprise server is configured to authenticate the user in the enterprise and may govern the use of specific encryption schemes approved by the enterprise to guarantee a level of security. A proxy server 605 is located outside of the enterprise domain 603 and configured to receive each encryption key request from encryption communication devices, deliver each encryption key request to the enterprise server, receive each encryption key from the enterprise server 601 in response, send each encryption key back to the sender of the encryption key request, receive each decryption key request from a decrypting communication device, deliver each decryption key request to the enterprise server 601, receive each decryption key from the enterprise server 601 in response, and send each decryption key to the sender of the decryption key request. In this configuration, the encryption and decryption key server system may be construed to cover both the enterprise server 601 and the proxy server 605, as illustrated in FIG. 6. Alternatively, the encryption and decryption key server system may be construed to cover just the enterprise server 601.

Encrypting and decrypting communication devices 101 and 103, the encryption and decryption key server system 105, the enterprise server 601, and the proxy server 605 may each be implemented with a computer system configured to perform the functions that have been described herein for the component and its subcomponents. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

Non-transitory, tangible, computer-readable media may be used. The media may contain a program of instructions configured to cause a computer system running the program of instructions to receive the encryption key requests, each including information identifying a sender of the encryption key request and at least one recipient of information that is to be encrypted with the requested encryption key. The programming instructions may cause the computer system, in response to the receipt of each encryption key request, to: send an encryption key to the sender of the encryption key request configured to enable the information to be encrypted and store information in the data storage system identifying the sender of the encryption key request in association with the at least one recipient identified in the encryption key request. The programming instructions may further cause the computer system to receive the decryption key requests and, in response, may send a decryption key to the sender of the decryption key request if and only if the sender of encrypted information and the sender of the decryption key request, as both identified by the information in the decryption key request, match, respectively, a sender of an encryption key request and an associated recipient, as both identified by the information in the data storage system.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, encryption schemes may allow further optimization in flows. This may eliminate steps required on originator or destination side, and/or may allow the client to cache out encryption keys for a longer time, eliminating the need for a per message call to the server.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The invention claimed is:

1. An encryption and decryption key server system comprising:
 a data storage system configured to store and retrieve data;
 a network interface configured to communicate information through a computer network; and
 a data processing module configured to:
  receive an encryption key request from the network interface, the encryption key request including information identifying a sender of the encryption key request and identifying at least one recipient of information that is to be encrypted with the requested encryption key;
  in response to the receipt of each encryption key request:
   cause the network interface to send an encryption key to the sender of the encryption key request configured to enable the information to be encrypted; and
   store information in the data storage system identifying the sender of the encryption key request in association with the at least one recipient identified in the encryption key request;
  receive a decryption key request from the network interface, the decryption key request including information identifying a sender of the decryption key request and a sender of the encrypted information; and
  in response to the receipt of each decryption key request, cause the network interface to send a decryption key to the sender of the decryption key request if and only if a) the sender of the encrypted information and the sender of the decryption key request, as both identified by the information in the decryption key request, match, respectively, b) the sender of the encryption key request and the at least one recipient of said information to be encrypted with the requested encryption key, as both identified by the encryption key request.

2. The encryption and decryption key server system of claim 1 further comprising an authentication module configured to authenticate the sender of the encryption key request and wherein the data processing module is configured prohibit the encryption key from being sent to the sender of the encryption key request unless the sender of the encryption key request is authenticated by the authentication module.

3. The encryption and decryption key server system of claim 1 further comprising an authentication module configured to authenticate the sender of the decryption key request and wherein the data processing module is configured prohibit the decryption key from being sent to the sender of a decryption key request unless the sender of the decryption key request is authenticated by the authentication module.

4. The encryption and decryption key server system of claim 1 wherein the encryption and decryption key server system does not send or receive the encrypted information.

5. The encryption and decryption key server system of claim 1 further comprising:
an enterprise server that is located within an enterprise domain and that contains the data storage system, the network interface, and the data processing module; and
a proxy server that is located outside of the enterprise domain and that is configured to:
receive the encryption key request;
deliver the encryption key request to the enterprise server;
receive the encryption key from the enterprise server;
send the encryption key to the sender of the encryption key request;
receive the decryption key request;
deliver the decryption key request to the enterprise server;
receive the decryption key from the enterprise server; and
send the decryption key to the sender of the decryption key request.

6. The encryption and decryption key server system of claim 1 wherein the encryption key request identifies multiple recipients of the information that is to be encrypted with the requested encryption key.

7. The encryption and decryption key server system of claim 1 wherein the at least one recipient of said information to be encrypted with the requested encryption key is identified by a phone number and wherein the encrypted information is an instant message.

8. The encryption and decryption key server system of claim 1 wherein the at least one recipient is identified by an email address and the encrypted information is an email.

9. The encryption and decryption key server system of claim 1 wherein the encryption key is one of a plurality of encryption keys that are different from each other.

10. An encrypting communication device comprising:
a network interface configured to communicate information through a computer network;
an encryption module configured to encrypt information using an encryption key which is to be decrypted by a decryption module; and
a data processor configured to:
cause the network interface to send an encryption key request to an encryption and decryption key server system at an address, the encryption key request including al information identifying a sender of the encryption key request and b) at least one recipient of information that is to be encrypted with the requested encryption key;
receive an encryption key from the network interface in response to the encryption key request;
cause the encryption module to encrypt the information using the encryption key; and
cause the network interface to: 1) send the encrypted information to the at least one recipient identified in the encryption key request at an address that is different from the address of the encryption and decryption key server system; and 2) cause the decryption module to send to the encryption and decryption key server system a decryption key request which identifies the sender of the encrypted information and the decryption module which is the sender of the decryption key request.

11. The encrypting communication device of claim 10 wherein the data processor is configured to cause the network interface to deliver information indicative of the address of the encryption and decryption key server system to the at least one recipient along with the encrypted information.

12. The encrypting communication device of claim 10 further comprising an authentication module configured to authenticate the sender to the encryption and decryption key server system.

13. The encrypting communication device of claim 10 wherein the encryption key request identifies multiple recipients of the information that is to be encrypted with the requested encryption key.

14. The encrypting communication device of claim 10 wherein the at least one recipient is identified by a phone number and wherein the encrypted information is an instant message.

15. The encrypting communication device of claim 10 wherein the at least one recipient is identified by an email address and wherein the encrypted information is an email.

16. The encrypting communication device of claim 10 wherein the address to which the encrypted information is sent is the address of the recipient.

17. The encrypting communication device of claim 10 wherein the address to which the encrypted information is sent is the address of an encrypted information server.

18. A decrypting communication device comprising:
a network interface configured to communicate information through a computer network;
an decryption module configured to decrypt encrypted information received from an encryption module using a decryption key; and
a data processor configured to:
receive encrypted information from the network interface that the network interface received from an address;
cause the network interface to send a decryption key request to an encryption and decryption key server system at an address that is different than the address from which the encrypted information was received, the decryption key request including information identifying a sender of the decryption key request and a sender of the encrypted information;
receive a decryption key from the network interface in response to the decryption key request if and only if a) the sender of the encrypted information and the sender of the decryption key request, as both identified by the information in the decryption key request, match, respectively, b) the sender of the encryption key request as identified by the information in the encryption key request; and cause the decryption module to decrypt the encrypted information using the decryption key.

19. The decrypting communication device of claim 18 further comprising an authentication module configured to authenticate the sender to the encryption and decryption key server system.

20. The decrypting communication device of claim 18 wherein the sender of the encrypted information identified by an email address and wherein the encrypted information is an email.

21. The decrypting communication device of claim 18 wherein the address from which the encrypted information is received is the address of the sender.

22. The decrypting communication device of claim 18 wherein the address to which the encrypted information is sent is the address of an encrypted information server.

* * * * *